United States Patent
Nelson et al.

(10) Patent No.: US 7,478,002 B2
(45) Date of Patent: Jan. 13, 2009

(54) APPARATUS AND METHOD FOR TRIMMING MULTIPLE SENSING ELEMENTS WITH A SINGLE TRIM RESISTOR

(75) Inventors: Charles Scott Nelson, Fenton, MI (US); David Cabush, Kokomo, IN (US); Kenneth D. Mowery, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 49 days.

(21) Appl. No.: 11/627,815

(22) Filed: Jan. 26, 2007

(65) Prior Publication Data
US 2008/0183414 A1 Jul. 31, 2008

(51) Int. Cl.
G01D 18/00 (2006.01)
G06F 17/40 (2006.01)

(52) U.S. Cl. ............................ 702/104; 702/65; 702/107
(58) Field of Classification Search ................. 702/104, 702/65, 107
See application file for complete search history.

(56) References Cited

U.S. PATENT DOCUMENTS

| | | | | |
|---|---|---|---|---|
| 4,385,611 A | | 5/1983 | Harper et al. | |
| 5,295,387 A | * | 3/1994 | Buie et al. | 73/1.38 |
| 5,390,528 A | * | 2/1995 | Zurek et al. | 73/1.19 |
| 5,504,681 A | * | 4/1996 | Sherman | 701/101 |
| 5,821,741 A | * | 10/1998 | Brokaw | 323/311 |
| 2004/0095225 A1 | | 5/2004 | Nelson | |
| 2004/0216527 A1 | | 11/2004 | Bills et al. | |
| 2005/0017760 A1 | | 1/2005 | Grasso et al. | |
| 2005/0184851 A1 | | 8/2005 | Nelson | |
| 2006/0091994 A1 | | 5/2006 | Nelson | |
| 2007/0013389 A1 | * | 1/2007 | Grudin et al. | 324/691 |

OTHER PUBLICATIONS

U.S. Appl. No. 11/321,927, filed Dec. 28, 2005 application pending.
EP Search Report dated Jun. 24, 2008.

* cited by examiner

*Primary Examiner*—Hal D Wachsman
(74) *Attorney, Agent, or Firm*—Paul L. Marshall

(57) ABSTRACT

A sensing system, including: a sensing assembly, the sensing assembly having: a trim resistor; and a controller removably secured to the sensing assembly, the controller being configured to determine a resistance value of the trim resistor; a database in operable communication with the controller, the database having a plurality of resistance values, each identifying a pair of compensation values; a microprocessor receiving the resistance value of the trim resistor, a first signal and a second signal, the resistance value of the trim resistor being used to define a selected pair of compensation values from the database, one of the selected pair of compensation values is used to adjust the first signal and the other one of the selected pair of compensation values is used to adjust the second signal.

14 Claims, 5 Drawing Sheets

| Factor for 1st parameter \ Factor for 2nd parameter | 0.75 | 0.80 | 0.85 | 0.90 | 0.95 | 1.00 | 1.05 | 1.10 | 1.15 | 1.20 | 1.25 |
|---|---|---|---|---|---|---|---|---|---|---|---|
| 1.25 | 1200 | 1210 | 1220 | 1230 | 1240 | 1250 | 1260 | 1270 | 1280 | 1290 | 1230 |
| 1.20 | 1190 | 1180 | 1170 | 1160 | 1150 | 1140 | 1130 | 1120 | 1110 | 1100 | 1090 |
| 1.15 | 980 | 990 | 1000 | 1010 | 1020 | 1030 | 1040 | 1050 | 1060 | 1070 | 1080 |
| 1.1 | 970 | 960 | 950 | 940 | 930 | 920 | 910 | 900 | 890 | 880 | 870 |
| 1.05 | 760 | 770 | 780 | 790 | 800 | 810 | 850 | 850 | 850 | 850 | 860 |
| 1.00 | 750 | 740 | 730 | 720 | 710 | 700 | 690 | 680 | 670 | 660 | 650 |
| 0.95 | 540 | 550 | 560 | 570 | 580 | 590 | 600 | 610 | 620 | 630 | 640 |
| 0.90 | 530 | 520 | 510 | 500 | 490 | 480 | 470 | 460 | 450 | 440 | 430 |
| 0.85 | 320 | 330 | 340 | 350 | 360 | 370 | 380 | 390 | 400 | 410 | 420 |
| 0.80 | 310 | 300 | 290 | 280 | 270 | 260 | 250 | 240 | 230 | 220 | 210 |
| 0.75 | 100 | 110 | 120 | 130 | 140 | 150 | 160 | 170 | 180 | 190 | 200 |

Figure 1

| | 0.75 | 0.80 | 0.85 | 0.90 | 0.95 | 1.00 | 1.05 | 1.10 | 1.15 | 1.20 | 1.25 |
|---|---|---|---|---|---|---|---|---|---|---|---|
| 1.25 | 1200 | 1210 | 1220 | 1230 | 1240 | 1250 | 1260 | 1270 | 1280 | 1290 | 1230 |
| 1.20 | 1190 | 1180 | 1170 | 1160 | 1150 | 1140 | 1130 | 1120 | 1110 | 1100 | 1090 |
| 1.15 | 980 | 990 | 1000 | 1010 | 1020 | 1030 | 1040 | 1050 | 1060 | 1070 | 1080 |
| 1.10 | 970 | 960 | 950 | 940 | 930 | 920 | 910 | 900 | 890 | 880 | 870 |
| 1.05 | 760 | 770 | 780 | 790 | 800 | 810 | 850 | 850 | 850 | 850 | 860 |
| 1.00 | 750 | 740 | 730 | 720 | 710 | 700 | 690 | 680 | 670 | 660 | 650 |
| 0.95 | 540 | 550 | 560 | 570 | 580 | 590 | 600 | 610 | 620 | 630 | 640 |
| 0.90 | 530 | 520 | 510 | 500 | 490 | 480 | 470 | 460 | 450 | 440 | 430 |
| 0.85 | 320 | 330 | 340 | 350 | 360 | 370 | 380 | 390 | 400 | 410 | 420 |
| 0.80 | 310 | 300 | 290 | 280 | 270 | 260 | 250 | 240 | 230 | 220 | 210 |
| 0.75 | 100 | 110 | 120 | 130 | 140 | 150 | 160 | 170 | 180 | 190 | 200 |

Factor for 1st parameter (vertical) / Factor for 2nd parameter (horizontal)

Figure 2

APPARATUS AND METHOD FOR TRIMMING MULTIPLE SENSING ELEMENTS WITH A SINGLE TRIM RESISTOR

BACKGROUND

The present invention relates to sensing elements and trim resistors and methods of using the same.

Sensors are positioned to monitor variables such as exhaust gases of an exhaust system. In most applications the sensors, which are exposed to the exhaust gases are typically associated with a controller comprising microelectronics in order to receive signals from the sensors and provide signals and/or commands to components of another system. Some sensors require a compensation resistor or trim resistor to be associated with the sensor and the electronics of the system in order to provide signals to the controller of the system in order to compensate for part-to-part variability in the sensor itself.

For example, and since some sensors cannot be made accurate enough to be used as made, a trimming resistor is employed to inform the controller how a particular sensor varies from the ideal sensor. Accordingly, the sensor with the trim resistor allows the system to accurately measure a particular constituent (e.g., sensor+trim resistor+controller).

In the past, there have been two ways to do this. The first being the incorporation of a trim resistor into the interface circuit of the microprocessor of the sensor system such that the circuit topology of the sensor system and the interface together includes the trim resistor as part of the active circuit that is amplifying the sensor signal. The trimmed resistor can then change a gain, offset or time constant in the interface to match the electronic interface performance to a specific sensor. This method is traditionally used in a purely analog interface.

The second method is more typically associated with an interface that utilizes a digital signal processing approach. In this method the actual sensor outputs are read by the digital interface in their raw, uncorrected form and then these raw values are normalized by a correction algorithm. In this application the trim resistor is read in as a separate input and its value is used as an input in a correction algorithm, which is performed by software. In this application, the trim resistor controls the correction however, it is not part of the main signal path from the actual sensor inputs.

In both of the aforementioned methods and/or processes one trim resistor is used for each parameter to be normalized. Thus, multiple trim resistors are required for multiple sensor inputs.

Accordingly, it is desirable to provide a sensor wherein two or more compensation values may be determined with a single trim resistor.

SUMMARY OF THE INVENTION

In one exemplary embodiment, a sensing system is provided. The sensing system, comprising: a sensing assembly, the sensing assembly having: a trim resistor integrally formed with the sensing assembly, the trim resistor having a resistance value; a first sensing element for providing a first signal in response to a first sensed condition; a second sensing element for providing a second signal in response to a second sensed condition; and a controller removably secured to the sensing assembly and receiving the first signal and the second signal, the controller being configured to determine the resistance value of the trim resistor; a database associated with the controller, the database having a plurality of resistance values, wherein each resistance value in the database identifies a pair of compensation values; a microprocessor associated with the controller, the microprocessor receiving the resistance value of the trim resistor, the first signal and the second signal, wherein the microprocessor selects a pair of compensation values from the database in response to the resistance value, and one of the pair of compensation values is used to adjust the first signal to provide a first adjusted signal and the other one of the pair of compensation values is used to adjust the second signal to provide a second adjusted signal.

In another exemplary embodiment a method for adjusting multiple sensor inputs from multiple sensors of a sensing system is provided, the method comprising: determining a resistance value of a trim resistor of a sensing assembly removably connected to a controller of the sensing system; using the resistance value of the trim resistor to determine a pair of compensation values; generating a first signal from a first sensing element of the sensing assembly in response to a first sensed condition, the first signal being received by the controller; generating a second signal from a second sensing element of the sensing assembly in response to a second sensed condition, the second signal being received by the controller; using one of the pair of compensation values to adjust the first signal to provide an adjusted first signal; and using the other one of the pair of compensation values to adjust the second signal to provide an adjusted second signal.

BRIEF DESCRIPTION OF THE DRAWINGS

FIGS. 1 and 2 are a schematic illustration of a look up table in accordance with an exemplary embodiment of the present invention;

DETAILED DESCRIPTION OF EXEMPLARY EMBODIMENTS

Figure 3:
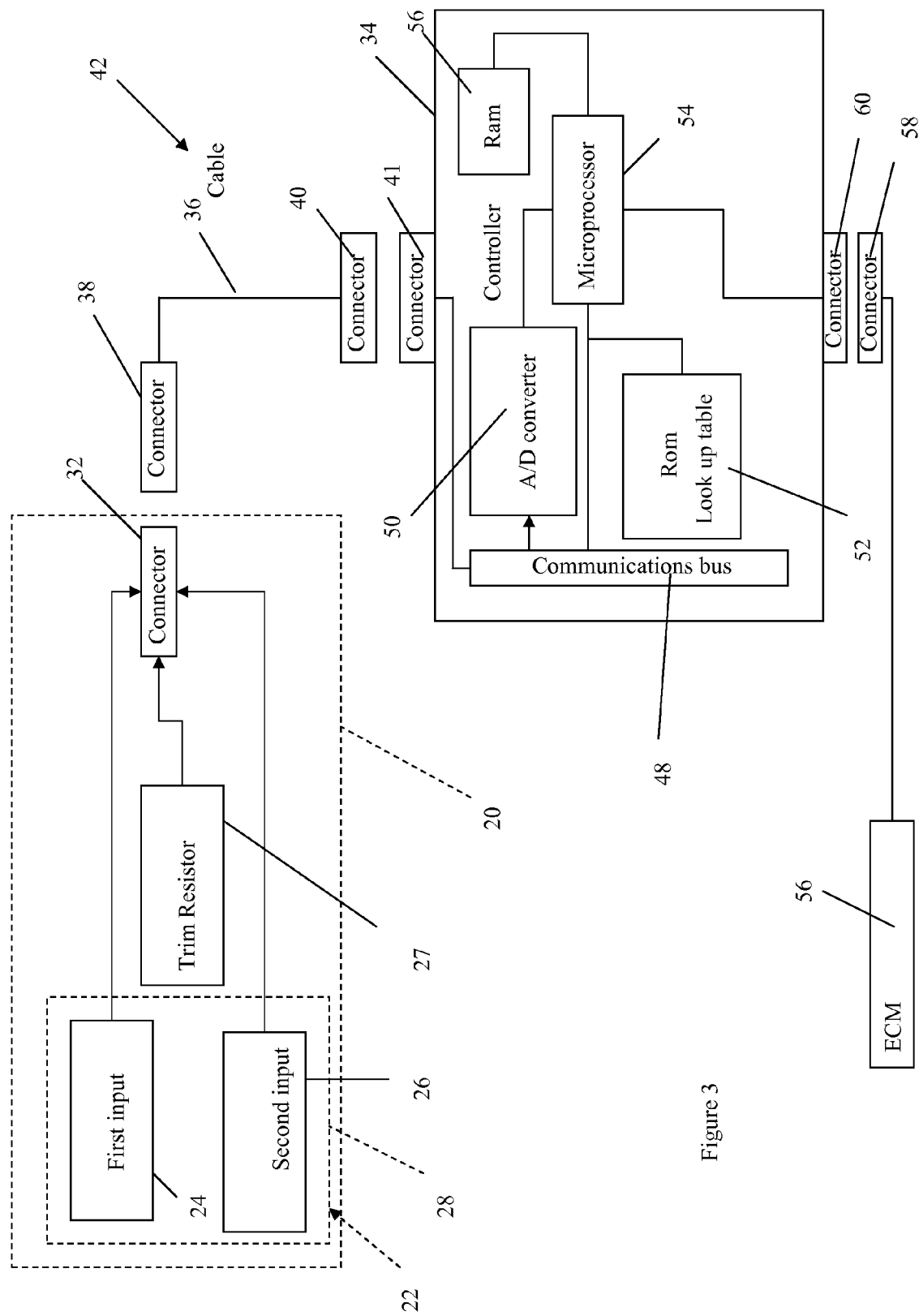
FIG. 3 is a schematic illustration of a sensing system constructed in accordance with an exemplary embodiment of the present invention.
Figure 4:
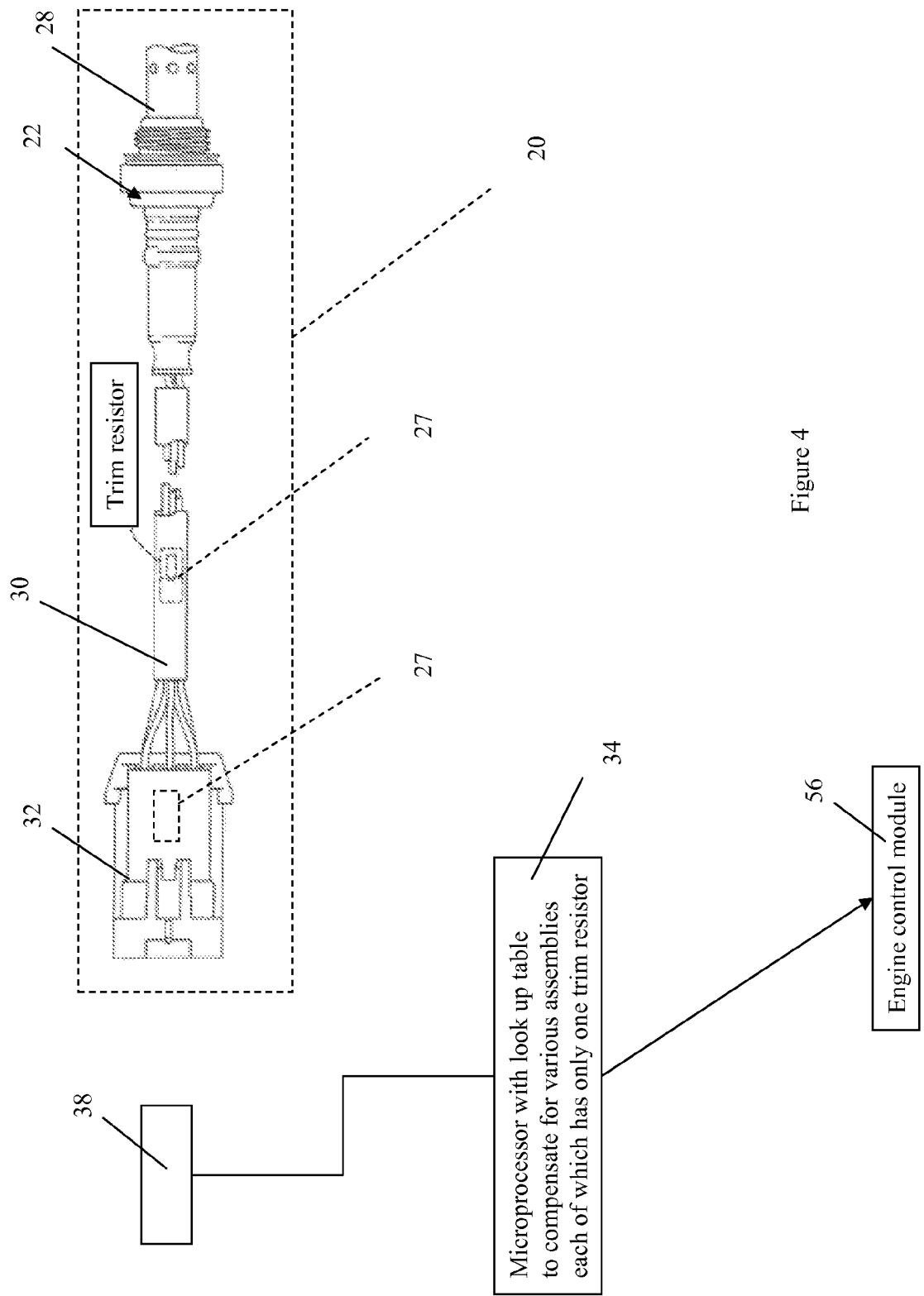
FIG. 4 is a schematic illustration of a sensing assembly constructed in accordance with an exemplary embodiment of the present invention.

The methods and apparatus set forth in exemplary embodiments of the present invention will allow two or more compensation values to be communicated to a controller in a sensing system so that the controller will be able to minimize the variations in any one of a plurality of sensing assemblies used in the sensing system. In accordance with exemplary embodiments of the present invention the sensor assembly is removably secured to a microprocessor or controller of the sensing system.

Furthermore and in accordance with an exemplary embodiment of the present invention the sensing system is configured to utilize a single resistance value of a single trim resistor to determine two or more compensation values for use with a pair of inputs each being from one of a pair of sensors of the sensing assembly. Thus, exemplary embodiments of the present invention eliminate the need for additional trim resistors along with additional controller inputs thus reducing the associated costs of the sensing system.

In accordance with an exemplary embodiment of the present invention the two or more values may include an offset and gain, or a gain for at least two different sensors or any single value information for more than one parameter.

In accordance with an exemplary embodiment of the present invention, the controller determines the value of the trim resistor and the value of the trim resistor is read in using an analog to digital converter in accordance with known techniques.

In accordance with exemplary embodiments of the present invention a plurality of compensation values are determined for a plurality of sensors. Non-limiting examples of the compensation values include offsets, gains, and other compensation values that are used to convert the manufactured sensor output to that of an ideal sensor, wherein a single trim resistor is used to provide these values. Non-limiting examples of trim resistors used in systems employing multiple trim resistors with multiple sensors or a single trim resistor with a single sensor are found in the following United States Patent applications: U.S. Ser. No. 10/472,409, filed Sep. 17, 2003 now abandoned Ser. No. 11/118,153 filed Apr. 29, 2005 (now abandoned); Ser. No. 11/297,903, filed Dec. 9,2005 (pending); and Ser. No. 11/321,927, filed Dec. 28, 2005 (pending), the contents each of which are incorporated herein by reference thereto. In accordance with a non-limiting exemplary embodiment of the present invention a single trim resistor which may be manufactured in accordance with the teachings of the aforementioned patent applications is used in a sensing assembly.

Referring now to FIGS. 1-5 and in accordance with exemplary embodiments of the present invention, a look up table or table 10 of a plurality of trim resistor values 12 are provided wherein each value has a corresponding first compensation value 14 and a corresponding second compensation value 16. For example, and referring now to FIG. 2 a trim resistor value 940 provides a corresponding first compensation value of 1.10 and a second compensation value 0.90. In accordance with an exemplary embodiment of the present invention the first compensation value 1.10 is used in a compensation algorithm to correct a signal output or reading of a first sensor while the second compensation value 0.90 is used to correct a signal output or reading of a second sensor. In accordance with an exemplary embodiment, the trim resistor value is in ohms or other suitable value indicative of the resistance of the trim resistor. In accordance with an exemplary embodiment of the present invention if an analog to digital reader of the controller reads a resistance value of 942 the closest values is used thus value 940 is used.

In accordance with exemplary embodiments of the present invention, the trim resistor values and the associated first compensation value and second compensation value are determined during manufacture of the sensors and their corresponding trim resistors. In other words and in order to compensate for variations between the manufactured sensor and an ideal sensor a trim resistor value is determined wherein the resistance of the trim resistor is determined to provide an offset or gain for a manufactured sensor element. When determining the data of the look up table a single trim resistor value is used to provide a first compensation value for a first sensor as well as a second compensation value for a second sensor. Thus, a single resistance value of the trim resistor is correlated to at least two different compensation values for at least two sensors. In other words, the data of table 10 comprises empirical data.

In the example of FIGS. 1 and 2 inter-bin interpolation is possible, but would only be of interest to the $2^{nd}$ parameter (e.g., the X axis shown in the table). Therefore, the discrete binning of the $1^{st}$ parameter would appear to be more coarse than the binning of the $2^{nd}$ parameter (e.g., Y axis). If inter-bin interpolation is used, the $2^{nd}$ parameter ("X" axis value) should be chosen for the most sensitive parameter. The progression of the values in the bins of the table shown in FIGS. 1 and 2 is chosen to reduce the possibility of large changes in either parameter for small changes in the trim resistor value. This assurance would not be possible for dimensions greater than 2. For example, the resistance values of 100 through 200 progress left to right and then the values of 210 through 310 progress right to left, etc., etc.

This concept is expandable, theoretically, to an infinite number of parameters that can be read from a single resistor read value using this method. Of course, there are limits to the number of bins and values that may be used with table 10.

In addition and in yet another exemplary embodiment, a single trim resistor value may be used to determine three independent compensation values for example and referring to the tables illustrated in FIGS. 1 and 2 the third compensation value is found in another axis for example a Z-axis which moves into or out of the 2-dimensionsal table illustrated in FIGS. 1 and 2.

Once the data for the look up table is determined for a plurality of sensors the data is used in exemplary embodiments of the present invention wherein a sensing system is provided and is capable of adapting or being used with any one of a plurality of sensing systems. Referring now to FIG. 3, a sensing assembly 20 constructed in accordance with an exemplary embodiment of the present invention is illustrated. Here sensing assembly 20 comprises a sensor 22 having at least a first sensing element 24 and a second sensing element 26 each being housed in a sensor housing 28 configured to be located in an exhaust stream. In one non-limiting exemplary embodiment the first sensing element is an oxygen sensor and the second sensing element is a NOx sensor. Of course, the first and second sensing elements may be any type of sensors. One non-limiting example of a sensor comprising multiple sensing elements is described in U.S. patent application Ser. No. 11/538,240 filed Oct. 3, 2006 (pending), the contents of which are incorporated herein by reference thereto. In the aforementioned application, multiple cells or sensing elements are configured to sense particular constituents (e.g., NH3, NOx as well as numerous others) and provide a discrete single, which in accordance with an exemplary embodiment of the present invention is adjusted by the compensation values determined based upon the single value of a trim resistor integral with the sensing assembly. As such, sensing assembly 20 will also comprise a trim resistor 27.

In accordance with an exemplary embodiment, the sensing assembly 20 comprises a wire harness 30 secured to the sensor at one end and a connector 32 at the other. In accordance with an exemplary embodiment connector 32 allows sensing assembly 20 to be removably secured to a controller or microprocessor 34 via a connecting cable 36 configured to be secured to connector 32 at one end via a connector 38 and another connector 40 at the other end wherein connector 40 is secured to a connector 41 of the controller. As used herein connectors 32, 38, 40 and 41 may be any one of a plurality of pin connector devices or equivalents thereof in order to provide an electrical connection between the sensing assembly and the controller. In an alternative exemplary embodiment, the wire harness is configured to be removably secured to the microprocessor wherein connecting cable is eliminated.

In accordance with an exemplary embodiment of the present invention the trim resistor is integrally connected to the wire harness. Alternatively, the trim resistor is located within the connector 32 of the sensing assembly thus the trim resistor is removable with the sensing assembly.

In accordance with an exemplary embodiment of the present invention a sensing system 42 is provided wherein the sensing system comprises sensing assembly 20, microprocessor 34 and cable 36 or alternatively sensing system 42 comprises sensing assembly 20 and microprocessor 34. In accordance with exemplary embodiments of the present invention the sensing assembly is removable from the microprocessor.

In accordance with an exemplary embodiment the data of the look up table is stored within the memory of the microprocessor, which is removably secured to the sensing assembly. Thus and as will be discussed herein, the microprocessor will provide the appropriate compensation values based upon the trim resistor input from the removable sensing assembly.

It is the removability of the sensing assembly from the controller or microprocessor that allows the sensing system to be used with a variety of sensing assemblies each of which has a trim resistor having a resistance value 12 corresponding to the particular sensing elements of the sensing assembly. In accordance with exemplary embodiments of the present invention, the controller or microprocessor of each sensing system will determine the resistance value of the sensing assembly by for example applying a known voltage or current to the trim resistor and determining the value of the trim resistor in accordance with known principles. For example and in one non-limiting embodiment, the controller provides a known voltage to the trim resistor and the controller determines the value (resistance) of the trim resistor. Other non-limiting exemplary embodiments include providing a known current from the controller or using a voltage divider with a known resistor integral to the controller. Of course, these are non-limiting examples of how the resistance of the trim resistor is calculated by the controller.

In accordance with an exemplary embodiment the controller or microprocessor has an internal power supply such as a battery or other electronic storage medium. In addition, the controller is electrically coupled to a power supply via the cable connected to the engine control unit. In one non-limiting example, the power is supplied by a vehicle power system.

In one exemplary embodiment, the microprocessor is configured to have a control algorithm that will provide the necessary compensation values for a particular sensing assembly. For example, the control algorithm utilizes the look up table to provide the appropriate compensation values regardless of the sensing assembly being used and regardless of the value of the trim resistor of the sensing assembly as the value of the trim resistor is used to determine the compensation values.

In accordance with an exemplary embodiment, controller 34 further comprises a communications bus 48, an analog to digital converter 50, a storage medium 52 comprising read only memory such as the data of table 10, a microprocessor or other equivalent processing device 54, memory (e.g., flash or random access memory) 56.

In an exemplary embodiment the resistance value of the trim resistor is determined by the controller by for example applying a voltage through cable 36 and the first signal of the first sensing element and the second signal of the second sensing element are provided to the controller via cable 36. Although a cable is illustrated it is conceivable that signals from the sensing assembly may be provided by any suitable means including but not limited to RF transmissions, optical, etc. as long as the sensing assembly is removably associated with the controller and the data of the look up table.

Once the signals are received the same are converted via the A/D converter to a suitable format for comparison and use with the data of table 10. For example, if the signals are provided in an analog format the A/D converter will provide a corresponding digital signal.

Thereafter, the microprocessor will use the determined resistance value to find a corresponding or matching value in the look up table for example if the resistance of the trim resistor is determined to be 940 ohms the corresponding value in the look up table will provide a first compensation value of 1.10 for use in a formula for adjusting or compensating the first signal output to be similar to that of an ideal sensor and a second compensation value of 0.90 for use in a formula for adjusting or compensating the second signal output to be similar to that of an ideal sensor. Thereafter, the signals are outputted for further use in another system for example an engine control module 56 via connectors 58 and 60 or any other equivalent connection device. One non-limiting example would be the use of the sensor outputs to indicate whether an engine is running lean or rich (e.g., oxygen sensor) during a regeneration cycle of the exhaust treatment device of the engine. In another alternative exemplary embodiment, the engine control module and the controller may be a single device.

It is understood that the data of table 10 is provided as non-limiting example of an exemplary embodiment of the present invention and the values disclosed therein are intended to be examples of trim resistor values and their associated compensation values. Accordingly, the values of table 10 may be other than those illustrated in the attached Figures.

In accordance with an exemplary embodiment and by having the database associated with the controller as well as the sensing assembly remotely associated with the controller, the microprocessor or the controller is easily adaptable to any one of a variety of sensing assemblies since the single integral trim resistor provides the information or identifies the compensation values to use with the sensors of that sensing assembly.

In other words, a first sensing assembly can be connected to the controller wherein the integral trim resistor provides a resistance of 940 ohms and as discussed above this causes the controller to use parameters 1.10 and 0.90 for the first and second sensor signals. Thereafter and if the sensing assembly is removed or replaced with a sensing assembly that now has a trim resistor output of 390 ohms the compensation values of 0.85 and 1.1 are used.

Accordingly, and in accordance with exemplary embodiments of the present invention, the controller with the database can be separately manufactured from the sensing assembly as the resistance value of the trim resistor is used to determine the appropriate compensation values. Moreover, the sensing assemblies are manufactured with integral trim resistors that provide discrete outputs or identification means usable in the identification of the compensation values to be used with the sensing elements of the sensing assembly. For example, a plurality of trim resistance values for a plurality of sensing elements are determined and then compiled into a database stored in the memory of the controller thus, each controller does not have to be specifically matched with each sensing assembly. Furthermore and should a sensing assembly need to be replaced in the field the controller will be adaptable to variation in the sensing elements.

In addition, and in accordance with an exemplary embodiment of the present invention a single trim resistor is used to determine at least two compensation values for two different sensing elements thus, the additional cost of multiple trim resistors is reduced.

Figure 5:
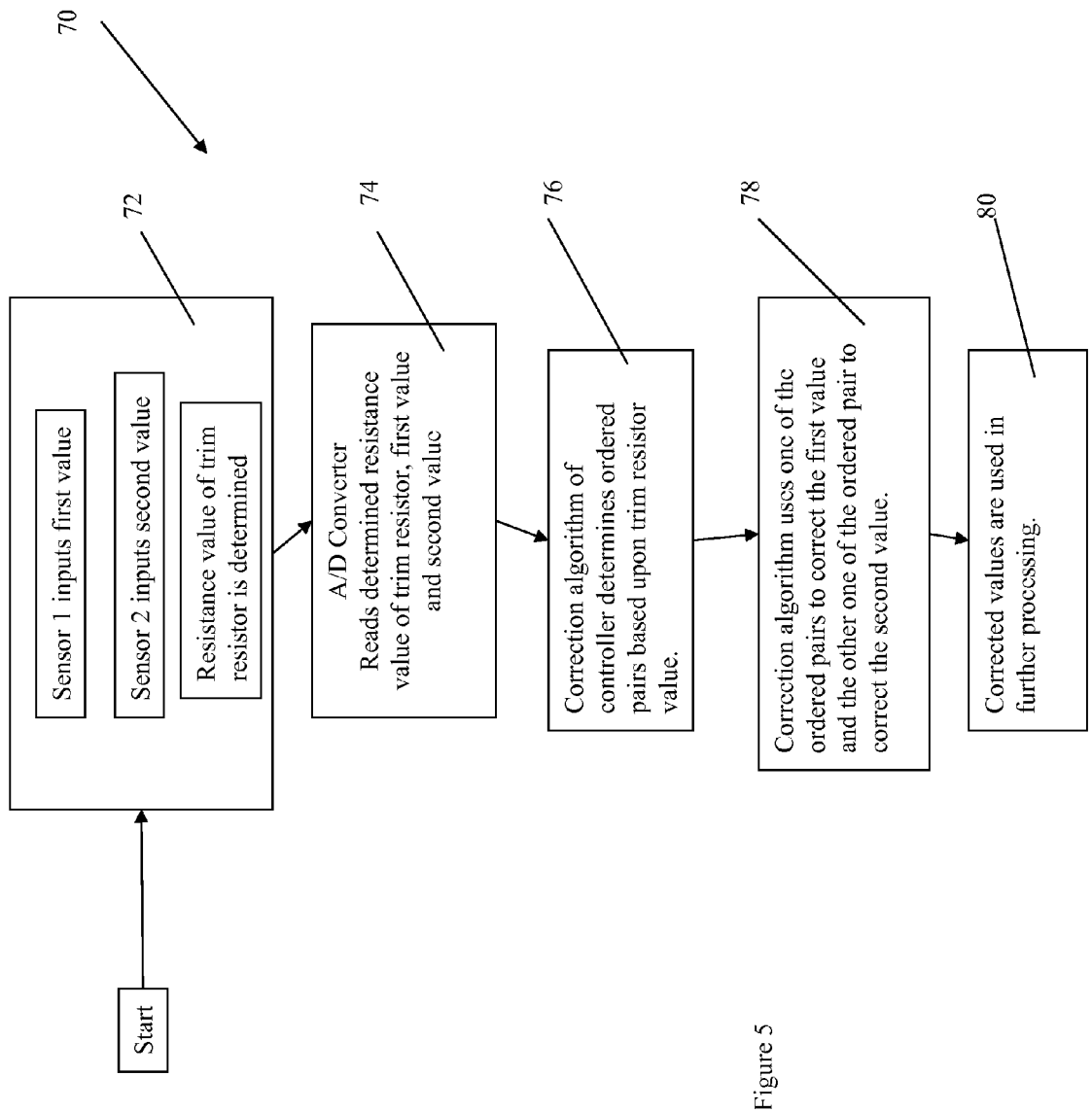
FIG. 5 is a schematic illustration of portions of a control algorithm in accordance with an exemplary embodiment of the present invention.

Referring now to FIG. 5 portions of a control algorithm 70 for executing a compensation program in accordance with an exemplary embodiment of the present invention is illustrated. During operation of the sensing system a sensing assembly will provide at least three inputs to the controller (a voltage for determining the trim resistance value, the first sensor signal and the second sensor signal). This is represented by step 72.

Thereafter and at step 74, the A/D converter will convert the appropriate signals and the converted signals will be provided to the microprocessor executing the correction algorithm. In accordance with an exemplary embodiment of the present invention the determined resistance value is inputted and the microprocessor calls up the compensation values for the first and second signals based upon the resistance value. This is represented by step 76. Thereafter, the correction algorithm uses one of the pair of compensation values to correct one signal and the other compensation value to correct the other signal. This is represented by step 78. Thereafter and at step 80 the corrected values are used in further processing.

In accordance with an exemplary embodiment, the controller will comprise a microcontroller, microprocessor, or other equivalent processing device executing commands of computer readable data or program for executing a control algorithm. In order to perform the prescribed functions and desired processing, as well as the computations therefore (e.g., processing of the received signals, and the like), the controller may include, but not be limited to, a processor(s), computer(s), memory, storage, register(s), timing, interrupt (s), communication interfaces, and input/output signal interfaces, as well as combinations comprising at least one of the foregoing. For example, the controller may include input signal filtering to enable accurate sampling and conversion or acquisitions of such signals from communications interfaces. As described herein, exemplary embodiments of the present invention can be implemented through computer-implemented processes and apparatuses for practicing those processes.

Furthermore, the controller will also comprise memory, which can be any one or more types of computer processor readable media, such as a read-only memory (ROM) device, volatile and nonvolatile media, removable and non-removable media, storage media including but not limited to, RAM, ROM, EEPROM, flash memory or other memory technology, CD-ROM, digital versatile discs (DVDs) or other optical disc storage, magnetic cassettes, magnetic tape, magnetic disk storage or other magnetic storage devices, or any other medium that can be used to store the desired information and that can be accessed by the algorithm of exemplary embodiments of the present invention.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sensing system, comprising:
    a sensing assembly, the sensing assembly having:
        a trim resistor integrally formed with the sensing assembly, the trim resistor having a resistance value;
        a first sensing element for providing a first signal in response to a first sensed condition;
        a second sensing element for providing a second signal in response to a second sensed condition; and
    a controller removably secured to the sensing assembly and receiving the first signal and the second signal, the controller being configured to determine the resistance value of the trim resistor;
    a database having a plurality of resistance values, each resistance value in the database identifies a pair of compensation values; and
    a microprocessor, the microprocessor receiving the first signal and the second signal, the resistance value of the trim resistor being used by the microprocessor to define a selected pair of compensation values from the database, one of the selected pair of compensation values is used to adjust the first signal to provide a first adjusted signal and the other one of the selected pair of compensation values is used to adjust the second signal to provide a second adjusted signal.

2. The sensing system as in claim 1, wherein the first sensing element and the second sensing element are components of a gas sensor.

3. The sensing system as in claim 1, wherein the selected pair of compensation values include an offset and a gain.

4. The sensing system as in claim 1, wherein the second signal corresponds to a first constituent signal parameter in response to a first sensed condition and the second signal corresponds to a second constituent signal parameter in response to a second sensed condition.

5. The sensing system as in claim 1, wherein the first signal, the second signal and the resistance value are analog signals and the sensing assembly further comprises an analog to digital converter, the analog to digital converter converts each of the first signal, the second signal and the resistance value to a digital signal in order to define the selected pair of compensation values from the database.

6. The sensing system as in claim 1, wherein the trim resistor is integrally secured within a wire harness of the sensing assembly.

7. The sensing system as in claim 1, wherein the trim resistor is integrally secured to a connector of a wire harness of the sensing assembly and the connector removably secures the controller to the sensing assembly.

8. The sensing system as in claim 1, further comprising an engine control module in electrical communication with the controller and the sensing assembly is a gas sensor.

9. The sensing system as in claim 8, wherein the selected pair of compensation values include an offset and a gain and the second signal corresponds to a first constituent signal parameter in response to a first sensed condition and the second signal corresponds to a second constituent signal parameter in response to a second sensed condition.

10. The sensing system as in claim 9, wherein the trim resistor is integrally secured within a wire harness of the sensing assembly.

11. A method for adjusting multiple sensor inputs from sensor elements of a sensing system, the method comprising:
    determining a resistance value of a trim resistor of a sensing assembly removably connected to a controller of the sensing system;
    comparing the resistance value of the trim resistor to a database to determine a pair of compensation values;
    generating a first signal from a first sensing element of the sensing assembly in response to a first sensed condition, the first signal being received by the controller;
    generating a second signal from a second sensing element of the sensing assembly in response to a second sensed condition, the second signal being received by the controller;
    using one of the pair of compensation values to adjust the first signal to provide an adjusted first signal; and
    using the other one of the pair of compensation values to adjust the second signal to provide an adjusted second signal.

12. The method as in claim 11, wherein the first sensing element and the second sensing element are located within a gas sensor of the sensing assembly, and the trim resistor is integrally located within a wire harness of the gas sensing assembly and the controller further comprises a look up table, the look up table having a plurality of pairs of compensation values each of which is associated with one of a plurality of resistance values stored in the look up table, and the controller compares the resistance value to one of the plurality of resistance values to determine the pair of compensation values.

13. The method as in claim 12, wherein each pair of compensation values include an offset and a gain.

14. The method as in claim 12, wherein the first signal corresponds to a first constituent signal parameter in response to a first sensed condition and the second signal corresponds to a second constituent signal parameter in response to a second sensed condition.

* * * * *